United States Patent

Shimada et al.

[11] Patent Number: 6,031,634
[45] Date of Patent: *Feb. 29, 2000

[54] IMAGE INFORMATION TRANSMITTING METHOD AND APPARATUS

[75] Inventors: Kazutoshi Shimada, Yokosuka; Eisaku Tatsumi, Kawasaki; Shigeki Mori, Koshigaya; Kazuhiro Matsubayashi, Yokohama; Shinichi Sunakawa, Kawasaki; Takashi Harada, Yokohama; Katsuhiko Nagasaki, Ichikawa; Ryoji Fukuda, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/490,247

[22] Filed: Jun. 14, 1995

[30] Foreign Application Priority Data

Jun. 21, 1994 [JP] Japan .................................. 6-138580

[51] Int. Cl.⁷ ...................................... H04N 7/36
[52] U.S. Cl. ............................. 358/426; 358/430
[58] Field of Search ................... 358/426, 430, 358/261.2, 467, 539; 348/19, 397, 400–402, 407–409, 412–417, 700–701

[56] References Cited

U.S. PATENT DOCUMENTS

| | | | |
|---|---|---|---|
| 4,430,526 | 2/1984 | Brown et al. ............... | 178/18 |
| 5,363,139 | 11/1994 | Keith ........................ | 348/415 |
| 5,416,520 | 5/1995 | Kuzma ....................... | 348/409 |
| 5,467,136 | 11/1995 | Odaka et al. ............... | 348/416 |
| 5,543,939 | 8/1996 | Harvey et al. ............. | 358/426 |

FOREIGN PATENT DOCUMENTS

| | | |
|---|---|---|
| 03014361 | 1/1991 | Japan . |
| 4-115656 | 4/1992 | Japan . |
| 2263603 | 7/1993 | United Kingdom . |

OTHER PUBLICATIONS

I.B.M. Tech. Discl. Bull., vol. 27, No. 1b, Jun. 1984, pp. 844–846, Gladley, "Method for transmitting only document change data".

*Primary Examiner*—Thomas D. Lee
*Assistant Examiner*—Stephen Brinich
*Attorney, Agent, or Firm*—Fitzpatrick, Cella, Harper & Scinto

[57] ABSTRACT

An image information transmitting/receiving apparatus for time and cost-saving repetitive transmission. In facsimile communication, image data where further information is added to previously-transmitted image data is often received. In the present apparatus, the original image data is stored, and only difference data from the original image data is transmitted, thus the whole image can be reproduced at the receiving side, using the received difference data. Upon transmitting the difference image information, identification information identifying the difference image information is added to the difference information, and the entire image data to be received by the receiving side is stored. Upon receiving the difference image information, the received difference information is combined with the stored image data, and an image is reproduced based on the combined image data. Further, the image data used for image reproduction is stored as original image data for the next transmission. In this manner, once the original image data is stored, only difference data is sent at each subsequent transmission, thus reducing the amount of transmission data.

54 Claims, 15 Drawing Sheets

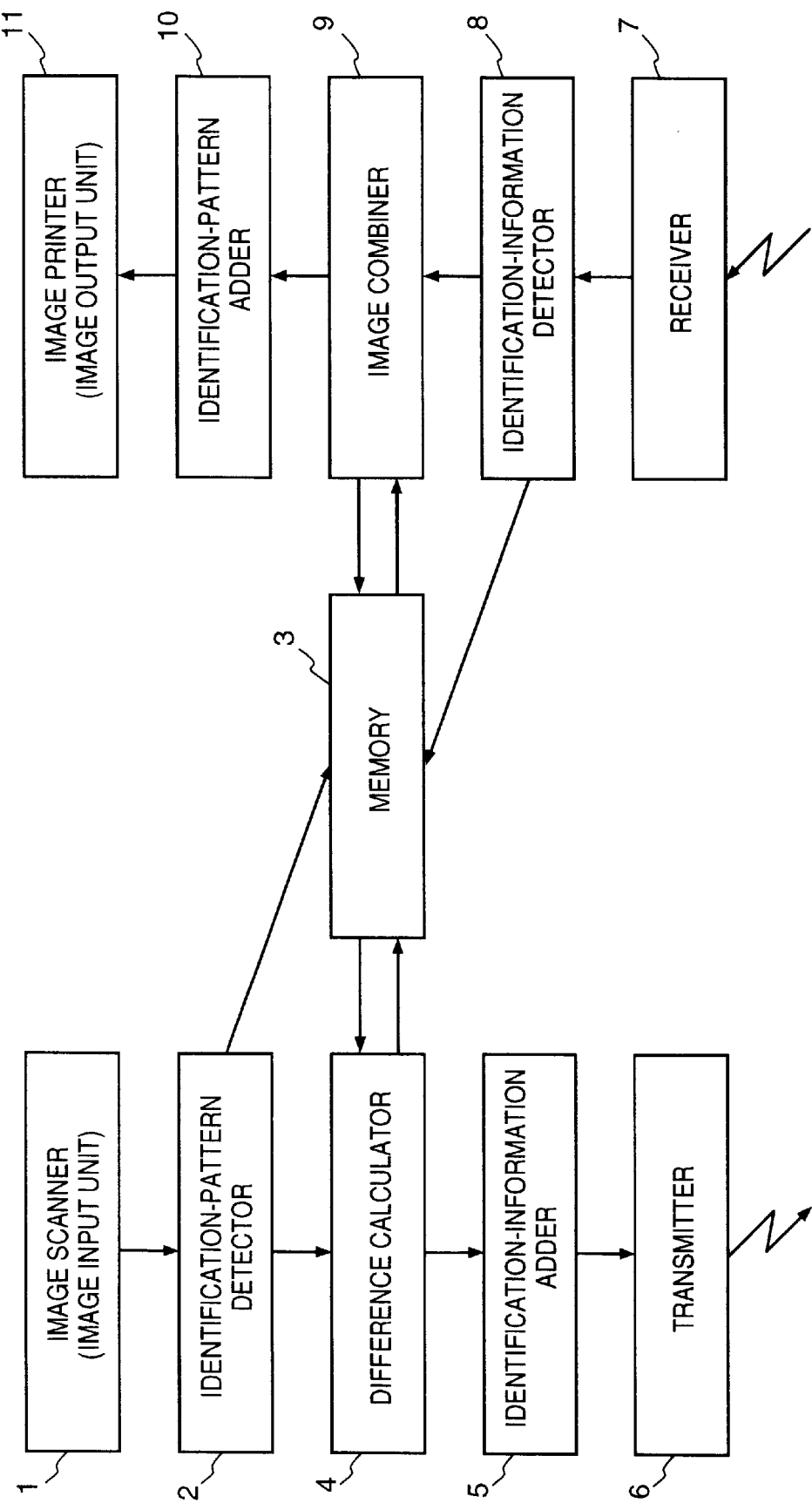

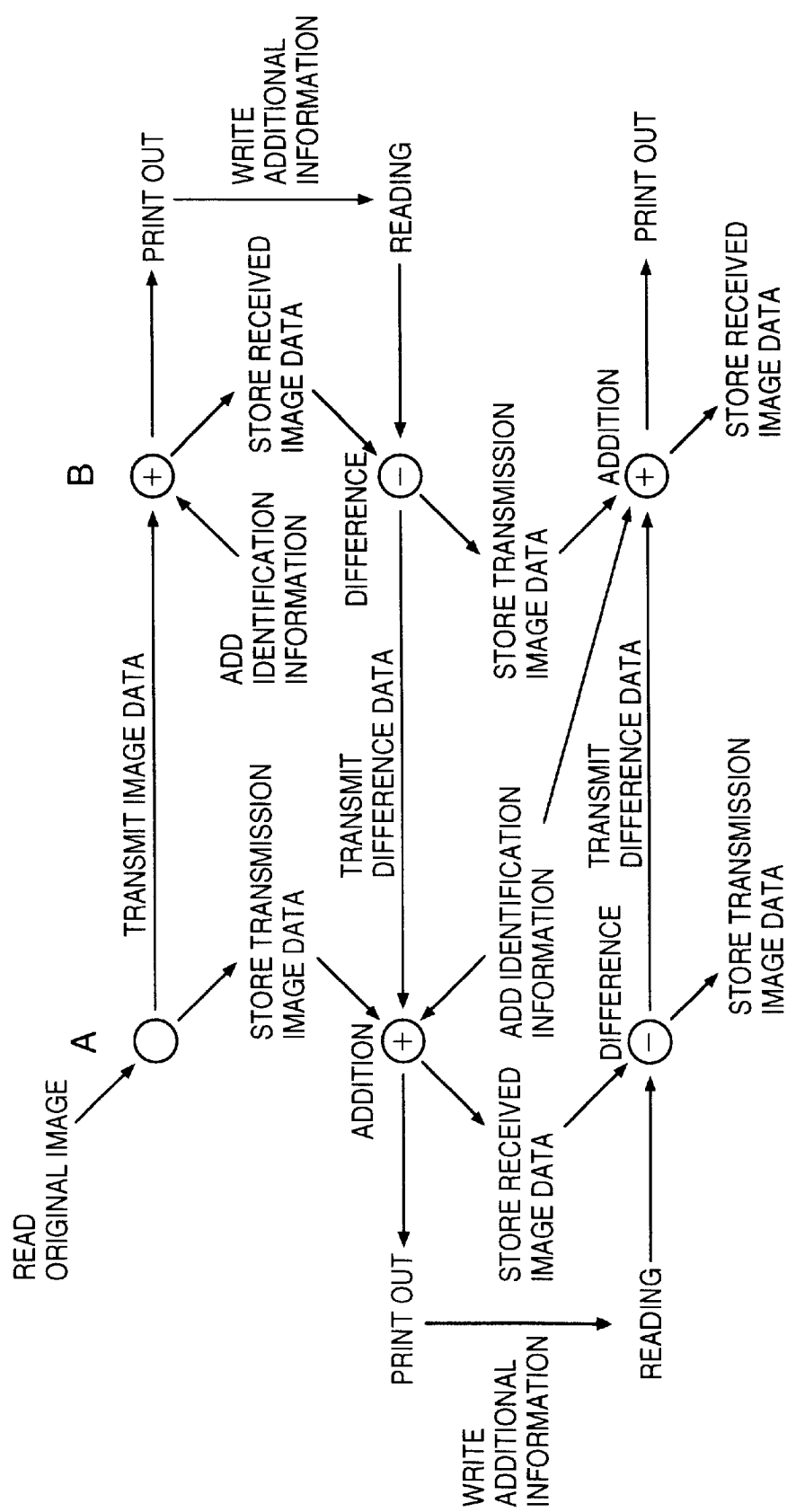

FIG. 3A
FACSIMILE COMMUNICATION PROTOCOL
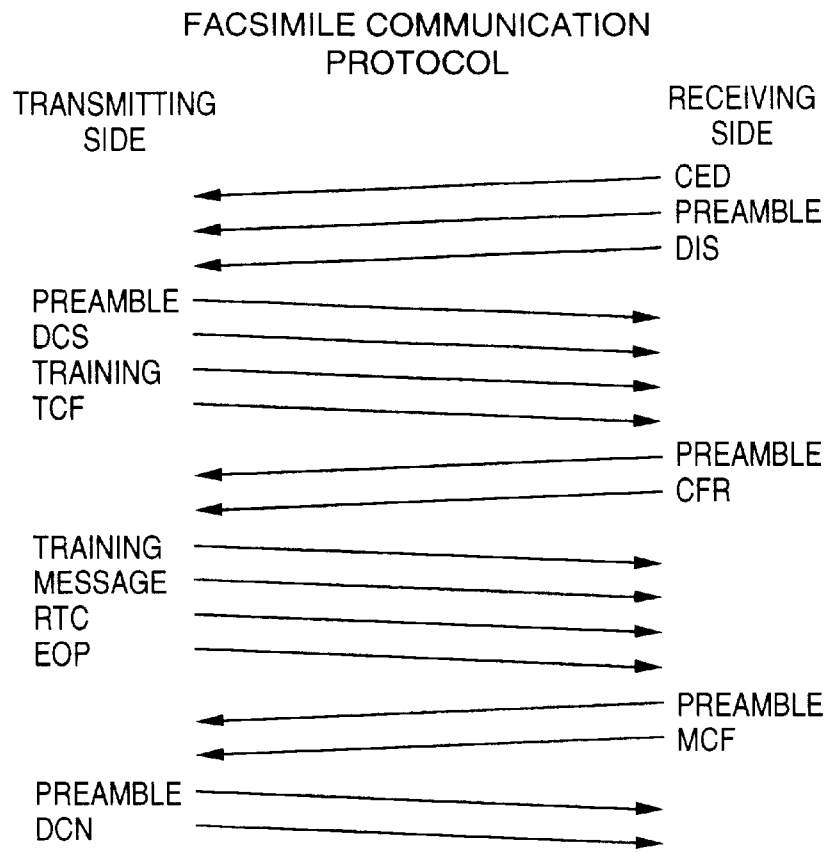
FIG. 3B
FIG. 3C
IDENTIFICATION CODE : CARACTER ARRAY-SUFFIX
① TEST1-1
② TEST1 (APPLICATION NO.)-1

IMAGE INFORMATION TRANSMITTING METHOD AND APPARATUS

BACKGROUND OF THE INVENTION

The present invention relates to an image information transmitting method and apparatus for transmitting image information via communication means such as a communication line.

Recently, information transmitting apparatuses, such as a facsimile apparatus are widely used in houses, since these apparatuses are small in size and light in weight. Further, they sell at a low price. In addition, facsimile apparatuses using normal paper as the recording medium, as well as conventional thermal paper, are becoming popular. Accordingly, the facsimile apparatuses are used not only in clerical work but also for a variety of purposes. For example, preparatory schools provide lessons and information services by facsimile communication.

The information transmission includes one-way communication and bidirectional communication where responses are sent back and forth. Furthermore, repetitive communication where a transmission is repeated based on the same information is available. Such repetitive communication is, for example, information transmission between a teacher and a student in a correspondence course in a preparatory school. The following are examples of information transmitted in this case.
1. Test questions transmitted to the student
2. Answers from the student
3. Corrections/guidance to the answers
4. Questions to the corrections/guidance
5. Answers to the questions The same information is transmitted more than twice based on the same test question. That is, when the test questions are transmitted to the student, the student handwrites answers on output paper on which the received test questions are printed, and transmits the answers via facsimile using the paper as an answer sheet. The teacher hand-writes corrections/guidance on output paper on which the answers received from the student are printed, and transmits the corrections/guidance to the students. In this manner, the transmission between the teacher and the student is repeated, and at each transmission, further information is added to the same original image data.

In the above conventional repetitive communication, although the inlet is merely to send additional information based on the same information, each transmission sends the same original image data as base image information. This is wasteful in transmission time and transmission fees.

SUMMARY OF THE INVENTION

The present invention has been made in consideration of the above situation, and has as its object to provide an image information transmitting method and apparatus which compresses information to be used repetitively and reduces time and costs for image information transmission.

According to the present invention, the above object is attained by providing an image information transmission apparatus for transmitting image information to a connected device, comprising: memory means for storing original image information; input means for inputting image information; calculation means for calculating difference image information between the image information inputted by the input means and the original image information stored in the memory means; and transmission means for transmitting the difference image information calculated by the calculation means.

Further, the above object is attained by providing an image information transmission method for transmitting image information, comprising: a storage step of storing original image information; an input step of inputting image information; a calculation step of calculating difference image information between the image information inputted in the input step and the original image information stored in the storage step; and a transmission step of transmitting the difference image information calculated in the calculation step.

Further, the above object is attained by providing a facsimile apparatus for transmitting/receiving image information, comprising: a digitizer for inputting image information; first memory means for storing the image information inputted by the digitizer; second memory means for storing image information to be outputted; calculation means for calculating difference image information between the image information stored in the first memory means and the image information stored in the second memory means; transmission means for transmitting the difference image information calculated by the calculation means, with identification information identifying the difference image information; reception means for receiving image information; second detection means for detecting the identification information from the image information received by the reception means; combination means for, if the second detection means detects the identification information, combining the image information stored in the first memory means with the image information received by the reception means; and a display for display-outputting an image based on the image information combined by the combination means, wherein the second memory means holds the image information combined by the combination means.

The image information transmitting method and apparatus and the facsimile apparatus according to the present invention can save transmission time and costs by transmitting only difference data from repetitively-transmitted information and, can save memory capacity by storing a plurality of difference data with respect to one original image as difference files.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the construction of a facsimile apparatus according to a first embodiment of the present invention;

FIG. 2 is an explanatory view showing a facsimile communication diagram;

FIG. 3A is an example of a facsimile communication protocol using specific codes and specific patterns;

FIG. 3B is an example of a DCS signal format in the facsimile communication protocol in FIG. 3A;

FIG. 3C is an example of an identification code format in the facsimile communication protocol in FIG. 3A;

DETAILED DESCRIPTION OF THE PREFERRED EMBODIMENT(S)

Figure 4:
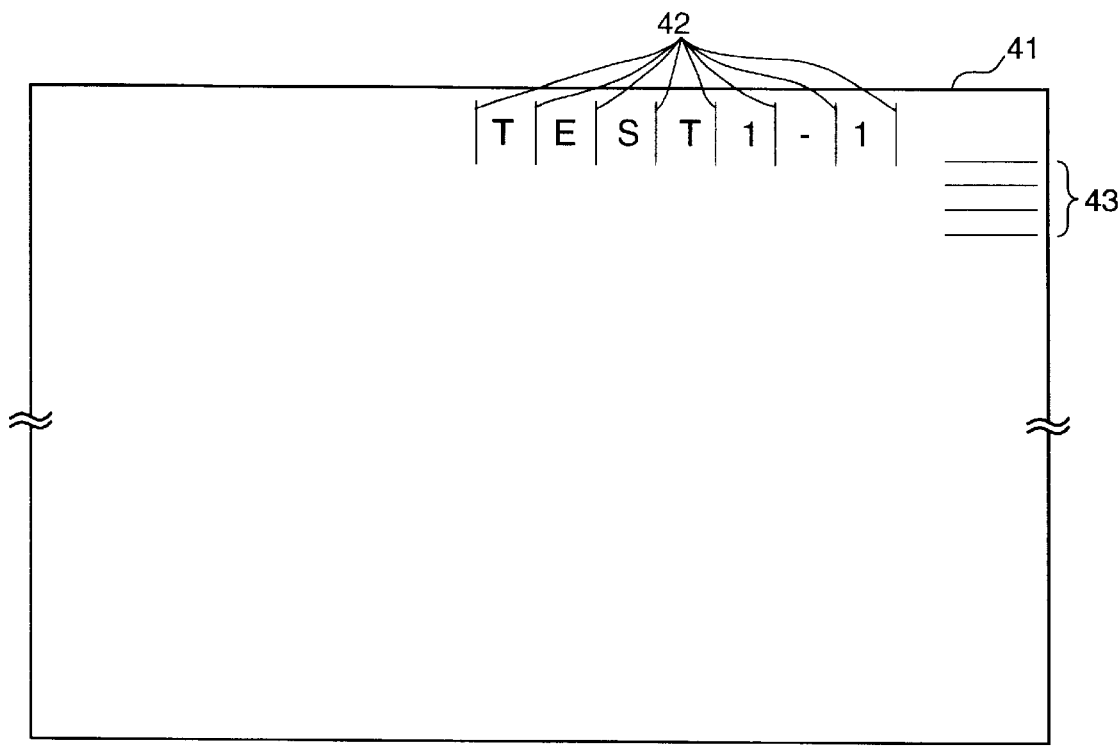
FIG. 4 is an output example where specific information is added.

Preferred embodiments of the present invention will be described in detail in accordance with the accompanying drawings.

First Embodiment

FIG. 1 shows characteristic construction of a facsimile apparatus as a first embodiment of the present invention.
<Construction of Facsimile Apparatus>

In FIG. 1, an image scanner 1 is realized by a contact sensor or a CCD sensor. An identification-pattern detector 2 detects whether or not pattern data in a predetermined format (to be described later) is added to read image data. The detection is made by means of software such as image processing or by means of hardware such as a circuit that detects a specific pattern. A memory 3 is a storage such as a hard disk drive or an magneto-optical disk drive, for storing received image data and transmitted data. A difference calculator 4 obtains the difference between image data stored in the memory 3 and image data to be currently transmitted. Upon transmission of difference image information as a facsimile signal, an identification-information adder 5 adds identification information, indicating that only the difference data is transmitted, to a facsimile control signal. A transmitter 6 manages image compression and facsimile communication protocol for transmitting image information to a general facsimile apparatus. The transmitter 6 includes a modem for transmitting a digital signal to a communication line. A receiver 7 receives image information as a facsimile signal. An identification-information detector 8 detects whether or not identification information is included in a facsimile control signal. An image combiner 9 combines image information in the memory 3 with received difference information. An identification-pattern adder 10 overlays specific pattern data onto image data upon printing an image. An image printer 11 prints out an image.

Note that a keypad may be provided so that an operator can instruct transmission of difference image information. In this case, the identification-pattern detector 2 detects existence/absence of instruction from the keypad.
<Outline of Repetitive Transmission>

FIG. 2 shows repetitive transmission of image information. Apparatuses A and B are facsimile apparatuses having the construction as shown in FIG. 1. In a case where image information is transmitted based on one original image, an operator of the apparatus A inputs information on the type of this transmission from the keypad in advance.

The apparatus A transmits image data of the original image with identification information indicative of the type of transmission (repetitive transmission), and stores the original image data and the identification information into the memory 3. The apparatus B stores the received image data, converts the received identification information into pattern data (hereinafter referred to as "identification pattern data"), adds the pattern data to the received image data, and prints out an image based on the image data where the pattern data is added. The receiver of the printout from the apparatus B hand-writes additional information on the output paper, and sets the paper at the apparatus B so as to read the paper. Since this paper has the identification pattern, the apparatus B calculates the difference between the stored image information and the read image information, and transmits the difference data. That is, the apparatus B extracts data of the hand-written image added by the operator of the apparatus B, and transmits only the extracted data. The apparatus A receives the difference data, and discriminates the identification information. If the identification information is included in the received information, adds the difference data to the initially-stored image data, again stores the image data with the difference data, and performs printing based on this image data. When the receiver of the printout from the apparatus A hand-writes additional information onto the print-out paper, a similar procedure is repeated. Thus, in this repetitive transmission, only difference data is actually transmitted.

Next, processing to adding identification-information will be described. First, transmission of a facsimile signal will be explained with reference to FIGS. 3A to 3C.

FIG. 3A shows typical facsimile transmission, therefore, detailed explanation will be omitted. First, a receiving side informs the characteristic of a receiving-side apparatus with a DIS signal, and a transmitting side informs the characteristic of a transmitting-side apparatus with a DCS signal. In this embodiment, an identification code as optional code is added to the end of the DCS signal (see FIG. 3B). FIG. 3C shows the format of the identification code, in which character array of a predetermined length and a suffix are connected with a mark "-". An example ① is a code where a suffix "1" is added to a character array "TEST 1". Considering a case where a plurality of attendants of communication respectively return responses to the same original image, a personal identification may be added to the format as shown in the example ①. An example ② is a code where an application number of a student is added to the character array "TEST 1". Since this identification code corresponds to the above-mentioned identification information, hereinafter, the identification information and the identification code will not be discriminated from each other.

<Addition of Identification Pattern>

Next, processing to add an identification pattern on the output side will be described. FIG. 4 shows an output example having the identification information is "TEST-1"[1] transmitted by the transmitting-side facsimile apparatus with the DCS signal. The receiving-side apparatus print-outputs the information in the format (identification pattern) as shown in FIG. 4.

The identification pattern "TEST-1" is added onto an upper portion of an output paper 41. Vertical lines 42 indicate the existence of the identification information upon re-reading the output paper 41. Also, the vertical lines 42 serve as reference lines for the vertical axis of the paper 41, separate the characters, and help determination of a reading direction. Horizontal lines 43 at an upper right portion serve as reference lines for the horizontal axis of the paper 41. These vertical and horizontal reference lines are used for correcting distortion of an original image upon reading to reduce error in calculation of difference data. Note that in this example, the identification information is outputted as characters, however, the identification information may be outputted as a symbol such as a bar code.

Hereinafter, image information transmitted with identification information or image information where identification-pattern data is added will be referred to as "difference image information".

<Reception Processing>

Figure 5:
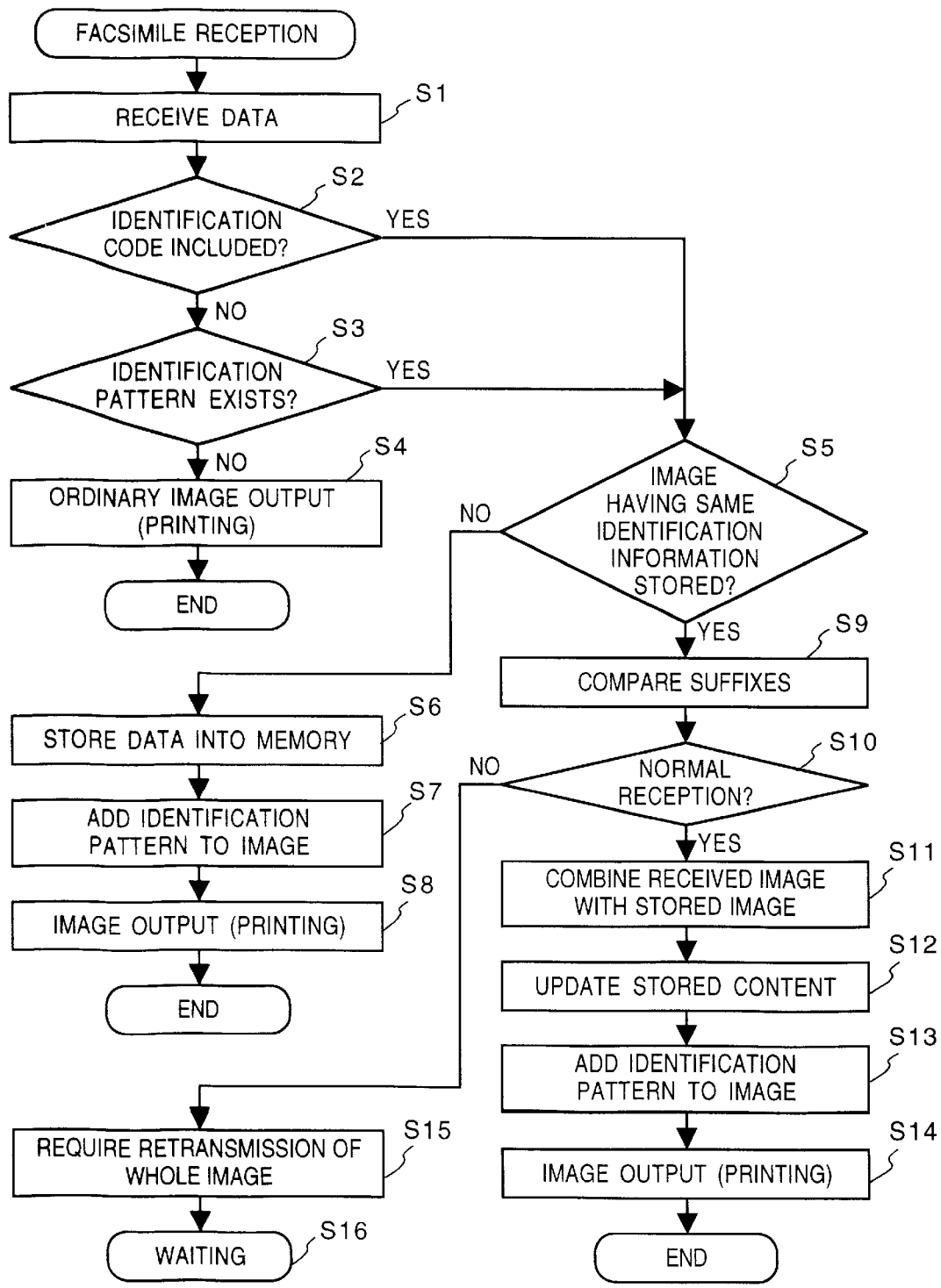
FIG. 5 is a flowchart showing reception processing in the facsimile apparatus of the first embodiment.
Figure 6:
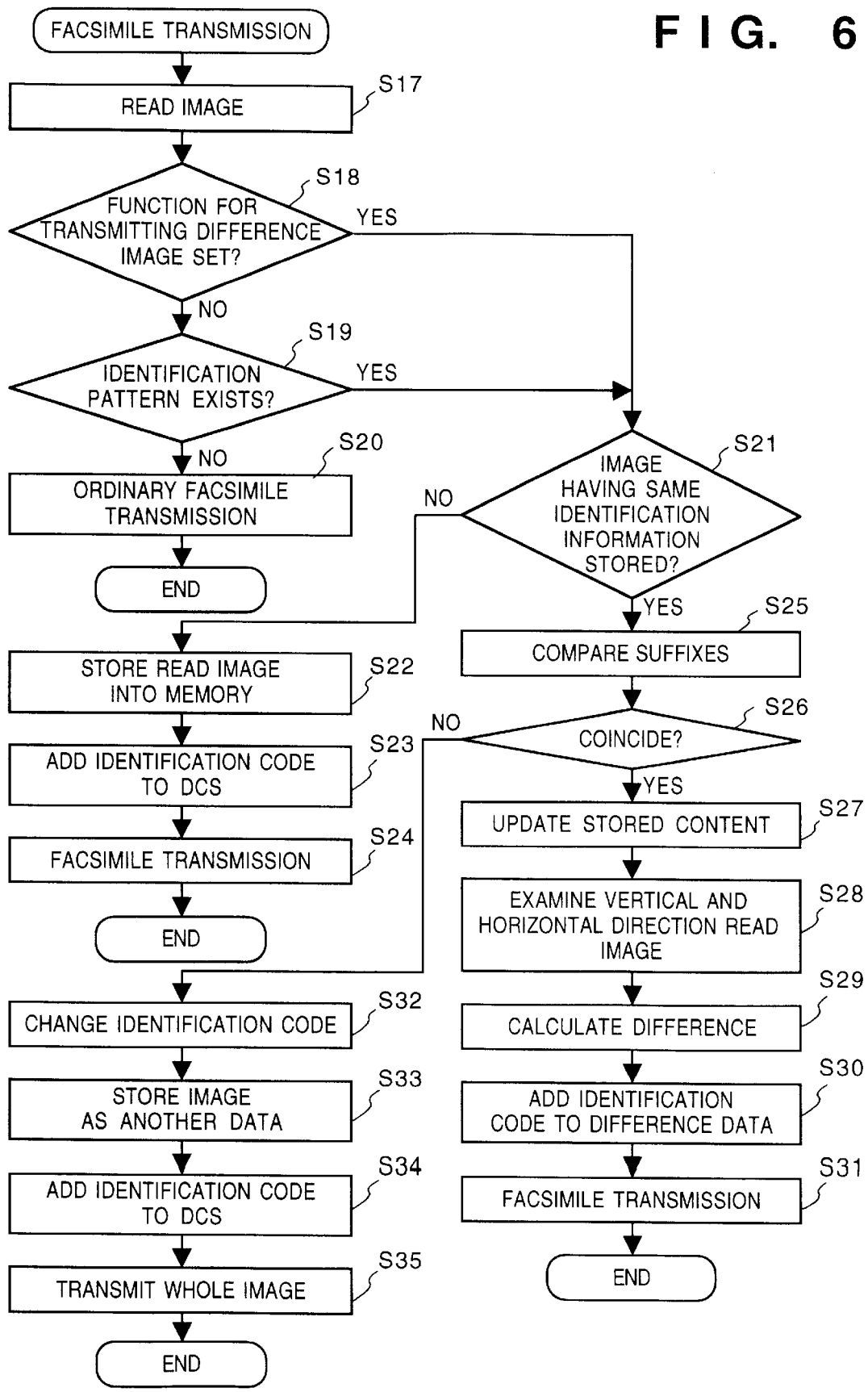
FIG. 6 is a flowchart showing transmission processing in the facsimile apparatus of the first embodiment.
Figure 7:
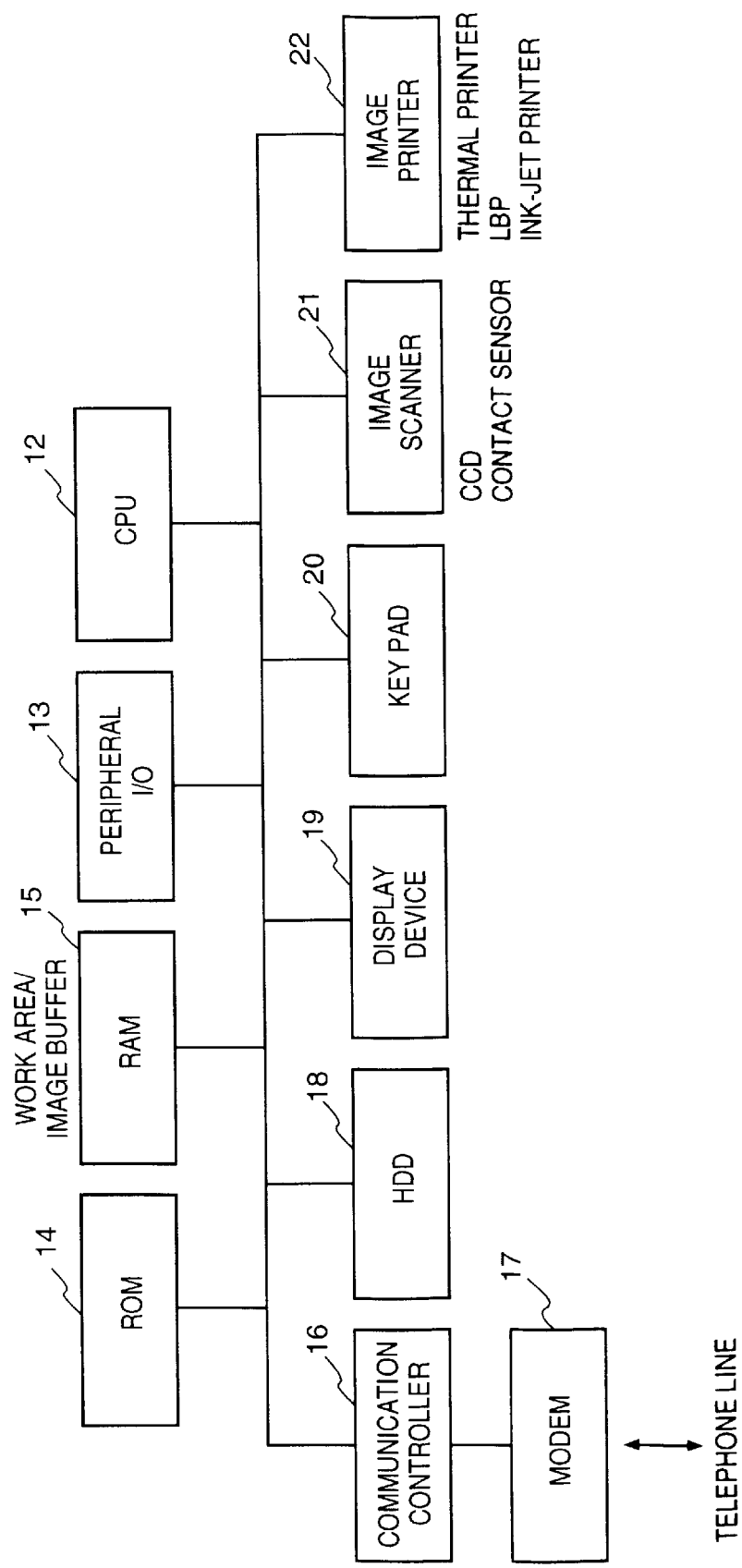
FIG. 7 is a block diagram showing another construction of the facsimile apparatus according to the first embodiment.

FIG. 5 is a flowchart showing the control of reception processing in the facsimile apparatus of the present embodiment. FIG. 7 shows the construction to execute this processing procedure. A CPU 12 is a processor such as an Intel 486 Processor by Intel Corporation or one of the RISC processors, for performing control/arithmetic operations of the overall apparatus and control of procedures as shown in FIGS. 5 and 6, by executing programs. A peripheral I/O controller 13 is a chip set having integrated functions for controlling the peripheral devices. A ROM 14 holds a BIOS (Basic Input and Output System) and fixed information. A RAM 15 serves as a program work area or an image buffer. A communication controller 16 controls facsimile communication protocol and high-level data link (HDL) procedure. A modem 17 is a modulator/demodulator for transmitting a digital signal onto a public line. A hard disk drive (HDD) 18 is a storage device for storing programs, user data and image data. A display device 19 is a liquid crystal display device (LCD) for displaying necessary information for facsimile communication. A keypad 20 has switches for operating the facsimile apparatus and key-inputting identification codes. An image input unit 21 comprises a sensor (e.g., a CCD sensor or a contact sensor) and a light source for illuminating an original image. An image printer 22 is, e.g., a thermal printer, a laser-beam printer (LBP) or an ink-jet printer, for print-outputting images. The hardware construction of this apparatus shown in FIG. 17 is substantially the same as that of generally-used facsimile apparatus.

The processings shown in FIGS. 5 and 6 are performed by the respective elements in FIG. 1, and also, they may be performed by the CPU 12 in FIG. 7 by executing programs.

When image data is received by a receiving-side facsimile apparatus, the information is sequentially stored into the image buffer such as the RAM 15 in the memory 3 (step S1). Then, whether or not the initial DCS signal includes an identification code as an optional code is determined (step S2). If NO, the top portion of the received image data is converted into image pattern data (step S3), and whether or not identification pattern data as shown in FIG. 4 exists in the image pattern data is determined. If NO, as the received information is not difference image information where identification information is added, it is determined that the current transmission is ordinary facsimile transmission, and ordinary image reproduction and image output are performed (step S4).

If it is determined in step S2 that an identification code is included in the DCS signal, or if identification pattern data is detected in step S3 and it is determined that the received image data is difference image information, whether or not image data having the same identification information exists in the memory 3 is determined (step S5). As image data to be transmitted as difference image information is stored in correspondence with its identification information, therefore, image data having a specific identification information, or image data, the same as received image data, having identification information where only the suffix is different, can be easily retrieved. In step S5, if image data having the same identification information as that of the difference image information is not found, the difference image information is stored as new difference image information into the memory 3 (step S6), and identification pattern data as shown in FIG. 4 is generated from the identification code and is added to the received image data (step S7), then an image based on the image data is printed out (step S8).

On the other hand, if image data having the same identification information exists in the memory 3, the suffix of the retrieved image data and that of the received image data are compared (step S9). If reception is normally performed, the suffix of the received image data must be that of the image data stored in the memory 3 plus one. Accordingly, whether the reception is normally performed or not is determined by examining these values (step S10). If YES in step S10, the received image data and the stored image data are combined while they are expanded (step S11). The resulting combined image data is compressed as received image data and stored (step S12). Then, the identification pattern data generated from the identification code is added to the image data (step S13), and an image is printed out (step S14). Note that when image data having identification information the same as already-stored identification information is newly stored, the image data stored in the memory 3 may be deleted. This saves memory capacity.

On the other hand, if No in step S10, i.e., if it is determined that the reception is not normally performed, a retransmission requirement for retransmission of the whole image data is transmitted (step S15), and reception of the whole image data is awaited (step S16). When re-transmitted image data is received, the receiving processing is repeated from step S1.

<Transmission Processing>

FIG. 6 is a flowchart showing transmission processing.

When the image scanner 1 reads an original image (step S17), whether or not a user has set a function for transmitting difference image information is determined (step S18). In this embodiment, this function can be manually set by the operator using the keypad. Further, whether or not identification pattern data as shown in FIG. 4 exists in partial image data around the top portion of the read image data is determined (step S19). The determination of the existence/absence of identification pattern is made by examining the shape of vertical and horizontal reference lines and the number of the reference lines, and by recognizing the character string and the suffix of the pattern using well-known OCR techniques. If it is determined in steps S18 and S19 that the transmission image data is not difference image information, the read image data is processed as ordinary transmission image data (step S20).

If YES in step S19, i.e., if it is determined that the read image data is difference image information, whether or not image data having the same identification information exists in the memory 3 is determined (step S21). If NO, the read image data is stored as newly-read image data into the memory 3 (step S22), at the same time, an identification code is added to the DCS signal (step S23), and a facsimile control signal is transmitted (step S24).

If YES in step S21, i.e., if image data having identification information the same as that of the read image data exists in the RAM 15, the suffix of the identification information of the read image data is compared with that of the stored image data (step S25). If the transmission is normally performed, the stored suffix and the read suffix correspond with each other. Accordingly, whether or not the transmission is normally performed is determined by comparing these values (step S26). If YES, the read suffix is updated as the suffix of new image data, and the image data is compressed and stored into the memory 3 (step S27).

Next, the correspondence of direction of axes of the read image data with the stored image data is examined (step S28) to calculate the difference between the read image data and the image data stored in the RAM 15 (step S29). Then, the identification code is added to the difference data (step S30), and the difference image information is transmitted (step S31).

When the direction of the read image data differs from that of the image data stored in step S28, the read or stored image data is rotated by well-known rotation processing, otherwise, the original is manually rotated before it is set for reading.

In a case where the suffixes do not coincide, there is a possibility that the read image data and the stored image data are different. In this case, the identification code is changed as a code of new image information (step S32), and the read image data is stored as another data (step S33). Then, the new identification code is added to the image data (step S34) and the entire image data is transmitted (step S35).

In a case where the operator newly instructs transmission of difference image information, it is determined in step S26 that the suffixes do not coincide, and the whole image data is transmitted.

It should be noted that upon storing image data, if image data having identification information the same as the current image data is found in the memory, the already-stored image data may be deleted. This saves memory capacity.

In the transmission/reception in accordance with the above procedures, once the function for transmitting difference image information is set, only difference data between the current transmission image data and the image data stored upon reading or reception is transmitted in the subsequent repetitive transmission. Thus, the overlapped image data (common part in the received image data and the image data to be transmitted) is not transmitted on the communication path, which saves communication time and costs.

Second Embodiment

The apparatus of the first embodiment is similar to a general facsimile apparatus. However, in this embodiment, the present invention is applied to a laptop terminal apparatus called a "pen computer". Such laptop terminal apparatuses including the pen computers and devices called "personal data assistants (PDA)", mainly operated by pen-input, have recently attracted public attention as personal information processing devices. As portable apparatuses, they are often used at remote places from offices, therefore, additional communication means is required. To meet this need, the apparatuses usually incorporate a facsimile modem for facsimile transmission/reception. Image output is made on a display screen as a display image, and image data is read as an image data file or inputted from a transparent input panel provided over the display screen.

Figure 8:
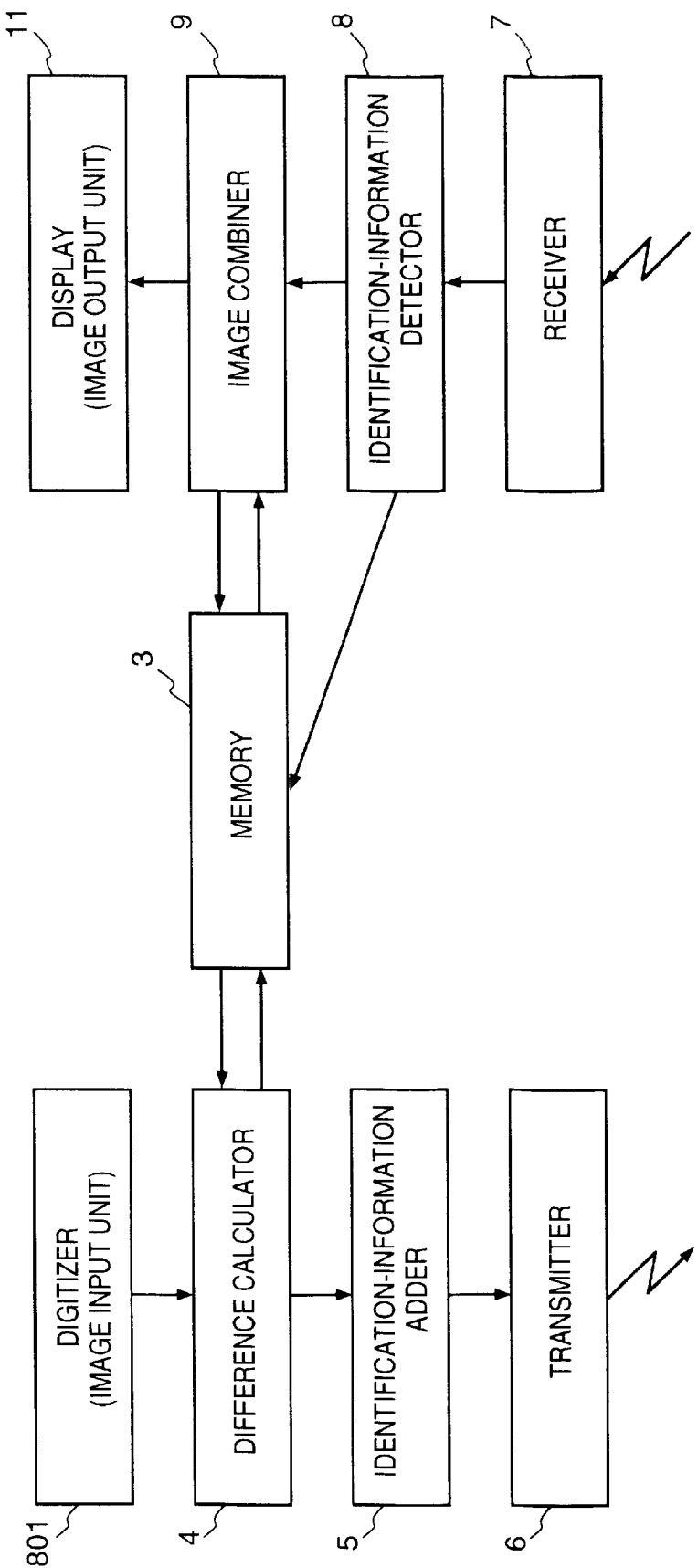
FIG. 8 is a conceptual block diagram showing the construction of an information processing apparatus according to a second embodiment of the present invention.

FIG. 8 shows the characteristic feature of the image input/output of the pen computer. FIG. 8 differs from FIG. 1 in that addition and detection of identification information is unnecessary upon input and output. That is, in a pen computer, an image based on received image information is not printed, but the received image information is directly displayed on a display 811, further, additional information is added via a digitizer 801 to the displayed image data. By virtue of this construction, the pen computer can recognize whether a displayed image is based on difference image information or not, and if the displayed image is corrected and transmitted, the pen computer can continue to recognize the difference image information, thus does not need discrimination of difference image information.

Figure 15:
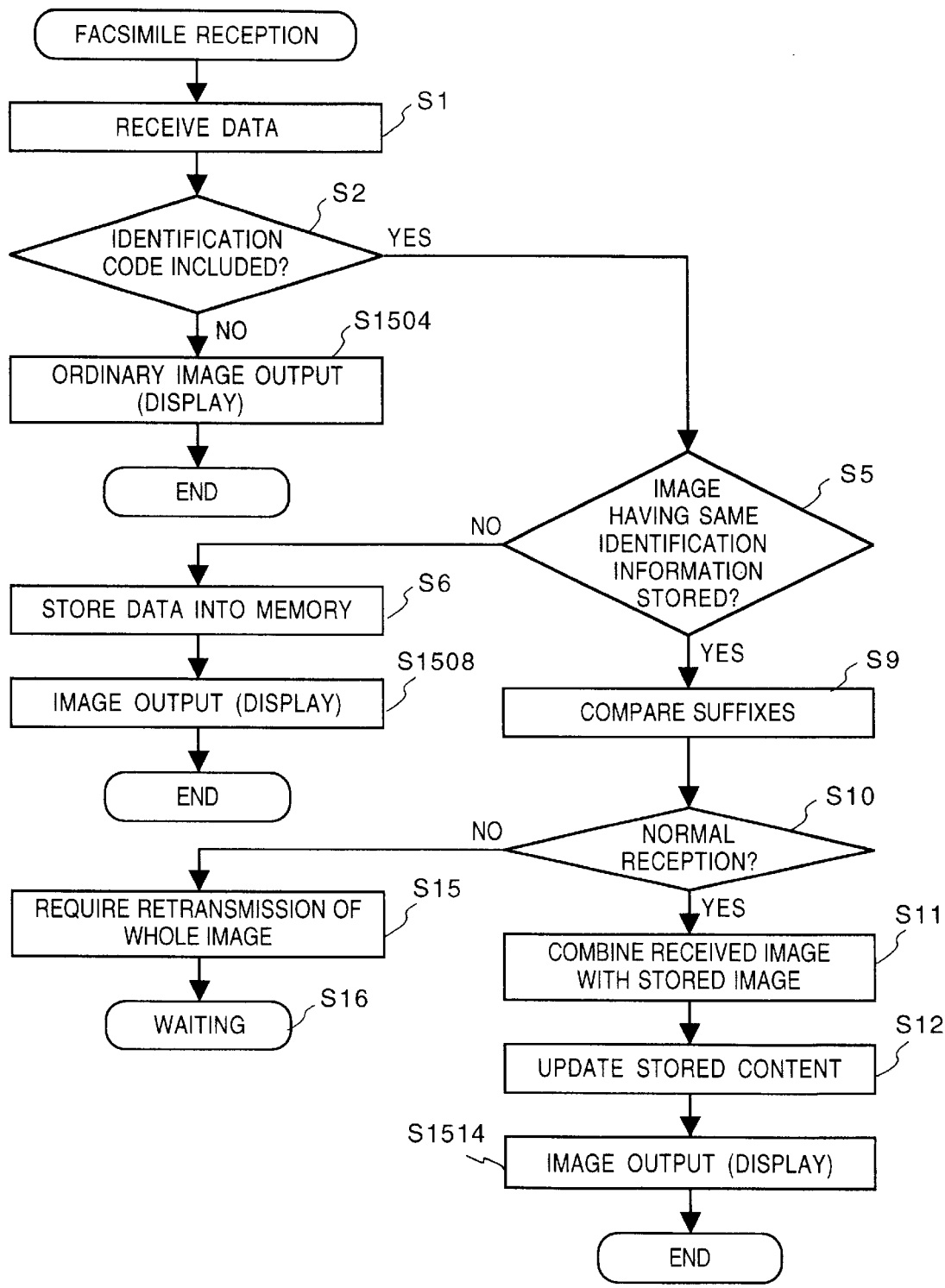
FIG. 15 is a flowchart showing reception processing of the apparatus according to the second embodiment.
Figure 16:
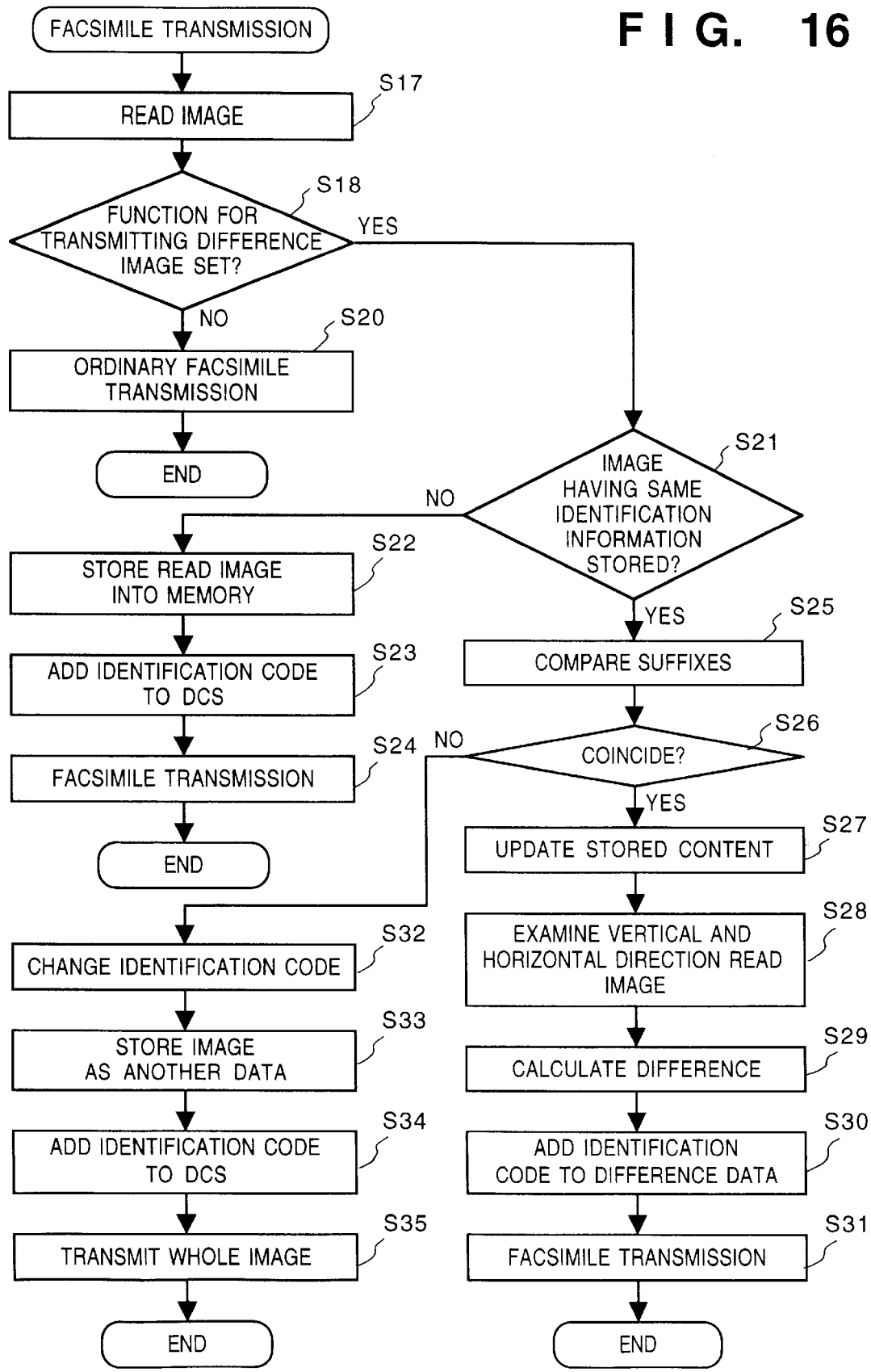
FIG. 16 is a flowchart showing transmission processing of the apparatus of the second embodiment.

FIGS. 15 and 16 are flowchart showing the control of the pen computer. These flowcharts are basically identical to those in FIGS. 5 and 6. The difference is that ① image output is made, not in the form of printout (steps S4, S8 and S14), but in the form of image display; ② since print-output is not performed, addition of identification pattern (steps S7 and S13) is not necessary and therefore omitted; ③ image reading (step S17) is reading from a file; and ④ determination of existence/absence of identification pattern (steps S3 and S19) is not performed.

Figure 9:
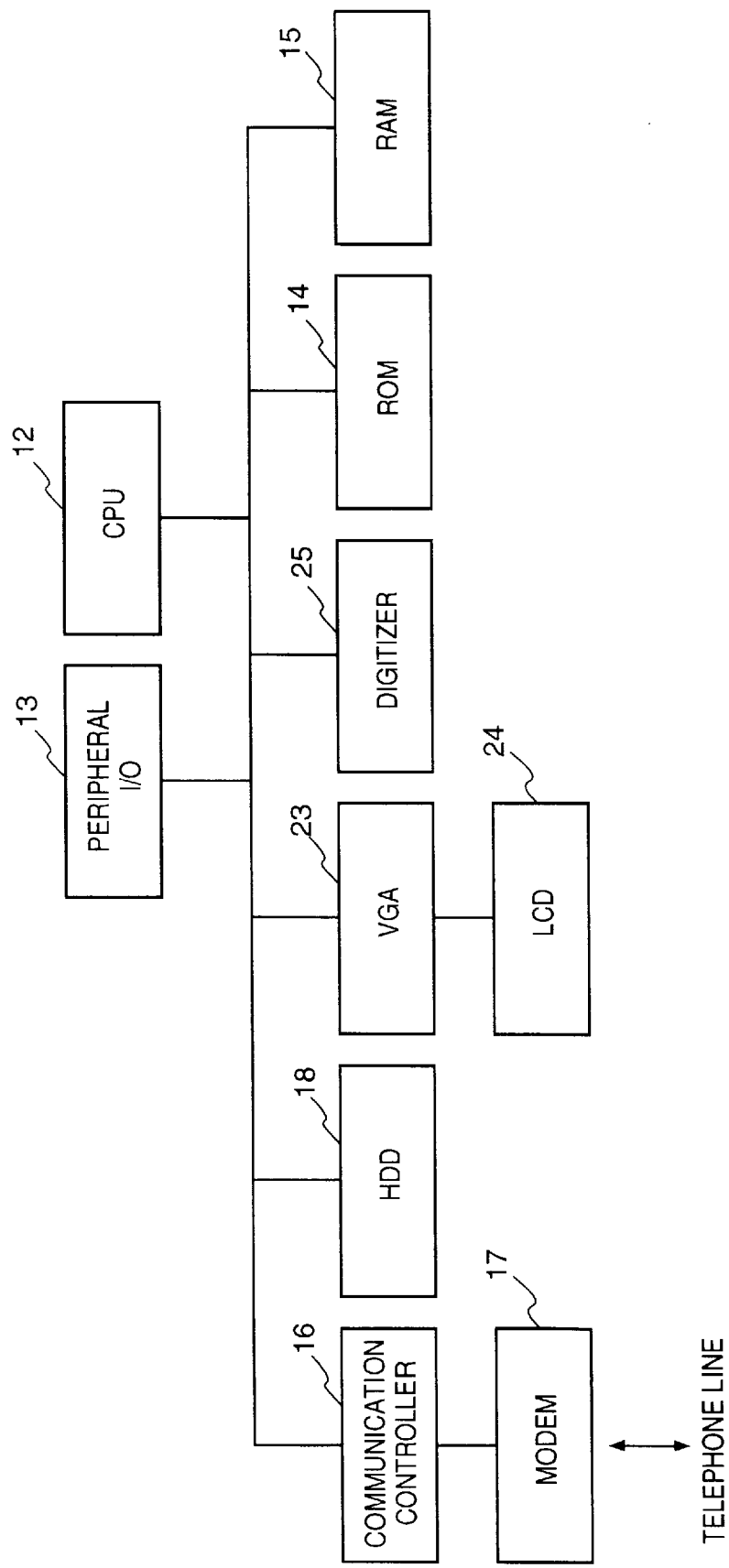
FIG. 9 is a block diagram showing the construction of the information processing apparatus according to the second embodiment.

FIG. 9 shows the hardware construction of a typical pen computer. The hardware architecture has AT compatibility, and as its operating system, Windows (Microsoft Corporation), Pen Point (GO Corporation) etc. is employed. Especially, the difference from the construction in FIG. 7 is that a VGA controller 23 and a 640×480 pixel liquid crystal display (LCD) 24 are used as the display 811, and a digitizer 25 is prepared so as to enable concurrent pen-input and display-output on the liquid crystal display. Input to the pen computer is basically made with an input pen, however, upon inputting a long sentence, a keyboard may be used as an auxiliary input device. In the previously-described example of correspondence course of education, with respect to the received questions, the student can directly write answers onto the digitizer with the input pen, as if he/she writes on a sheet of paper, and can transmit the answer. In comparison with the above-described example using facsimile apparatus, use of the repetitive communication is further improved.

In this manner, the present invention applied to an apparatus that does not perform print-output can reduce communication time and costs, and simplifies the apparatus construction, thus can provide a small-sized laptop information processing apparatus.

Note that the present embodiment is described as a pen computer of input-output integrated type, however, the present invention is applicable to a combination of a desktop computer with a digitizer or a desktop computer with an input device such as a mouse or a keyboard. Further, personal information processing apparatuses such as a PDA, having image communication function, e.g., a facsimile modem, may also be employed as well as the AT compatible apparatuses.

Third Embodiment

The second embodiment is described as an example a pen computer is used for the repetitive communication. Then, a third embodiment will be described as an example of repetitive communication where a plurality of additional informations are generated with respect to the same image. For example, in the above-described correspondence course, a host computer deals with answers from a plurality of students. Otherwise, in business, a pen computer deals with payment vouchers to many clients.

In the foregoing embodiments, when difference data is received, the difference data is combined with image data which has been transmitted and stored as received data, and upon transmission, the whole read data is stored as transmission image data. This repetitive communication is preferable when additional image data to the image data based on an original image is generated at one communication end. In a case where a plurality of operators at different places generate a plurality of additional image data, it is more preferable that the image data based on the original image and difference data to be added are stored separately, as a main file (original image data) and a difference file (difference data).

Figure 10:
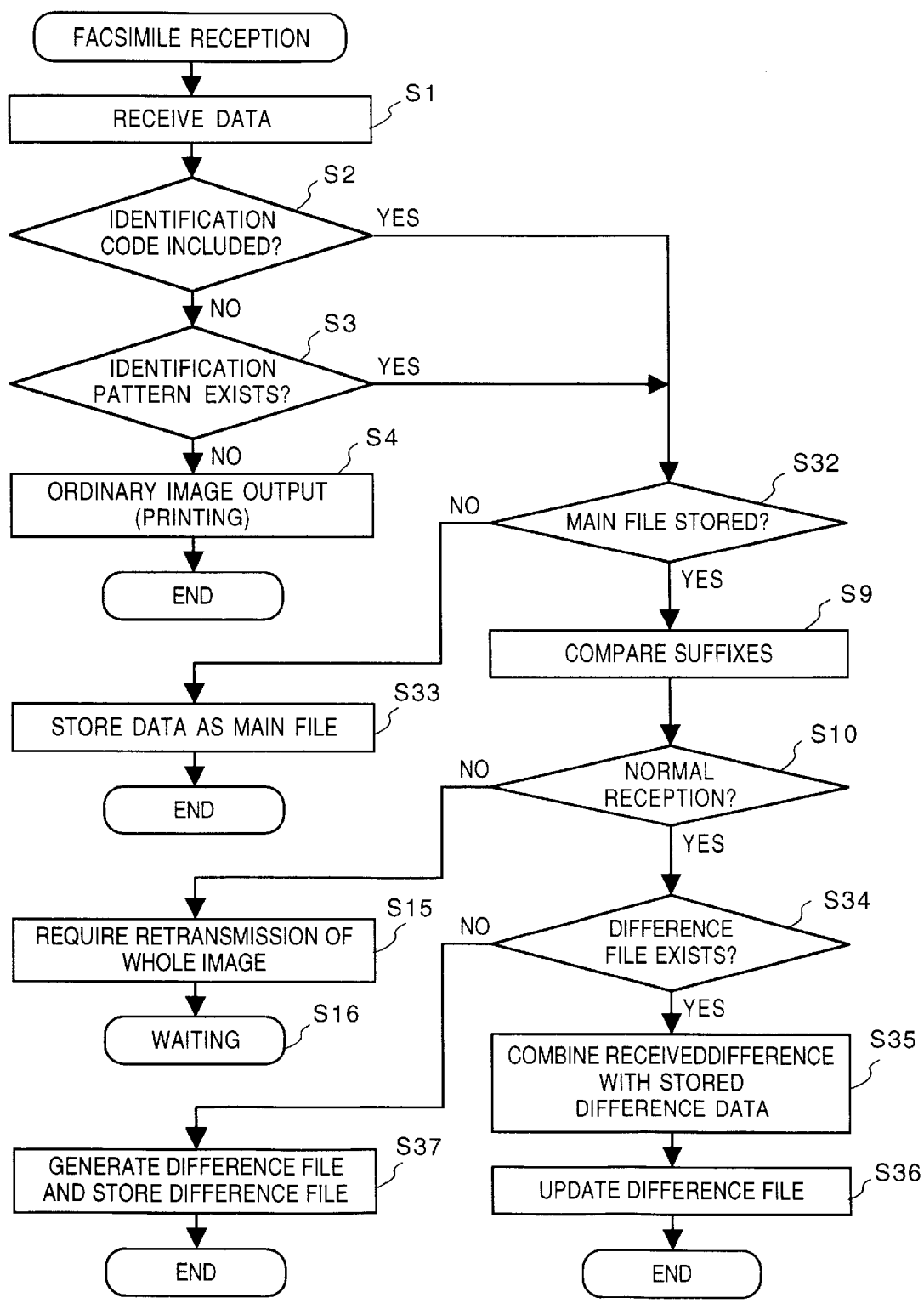
FIG. 10 is a flowchart showing reception processing of an information processing apparatus according to a third embodiment of the present invention.
Figure 11:
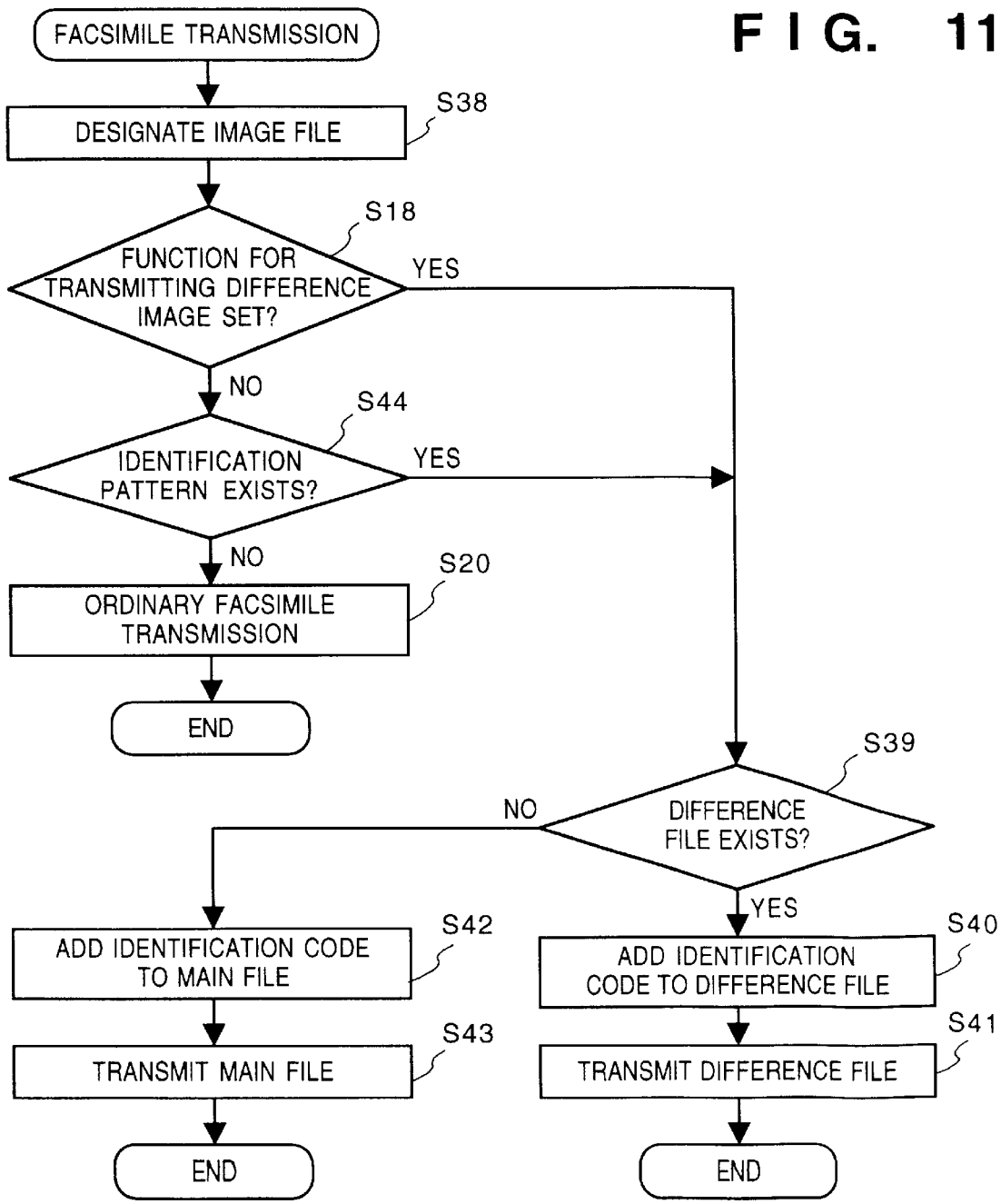
FIG. 11 is a flowchart showing transmission processing of the information processing apparatus of the third embodiment.

FIGS. 10 and 11 are flowcharts showing facsimile transmission and reception in this case. These processings are performed by the same CPU as that in the second embodiment. In FIGS. 10 and 11, the steps identical to those in FIGS. 5 and 6 have the same reference numerals, and the explanations of those steps will be omitted.

When image data is received (step Sl) and it is determined that the received image data is accompanied with identification information, whether or not a main file exists in the memory 3 is determined in step S32. If NO, the received image data is stored as newly-received image data, as a main file (step S33). If YES, i.e., the received data is stored as a main file in the memory 3, the suffix of the stored main file and that of the received image data are compared (step S9) to determine whether or not the current reception is normally performed. If YES, whether or not a difference file exists in the memory is determined (step S34). If YES, the received difference information is combined with the stored difference file (step S35), and stored as a new difference file (step S36). If no difference file exists in the memory 3, the received data is stored as a new difference file (step S37).

On the other hand, upon transmission, an image file to be transmitted is designated (step S38). The image file is a combination of a main file and a difference file, and is designated by each difference file. In a case where transmission of difference image information is set or identification pattern data is detected, whether or not a difference file exists in the memory 3 is determined (step S39). If YES, an identification code is added to only this file (step S40) and facsimile transmission of this file is made (step S41). If NO, it is determined that the image data to be transmitted is only a main file. Then, the identification code is added to the main file (step S42) and facsimile transmission of this file is made (step S43).

Figure 12:
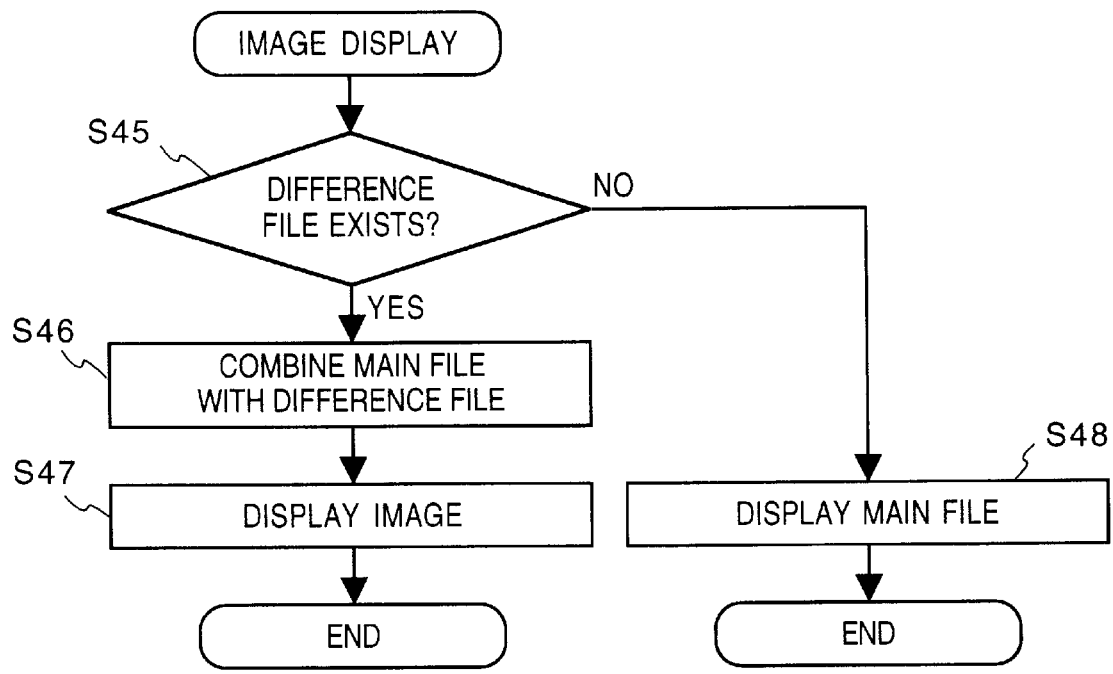
FIG. 12 is a flowchart showing image display processing of the information processing apparatus of the third embodiment.
Figure 13:
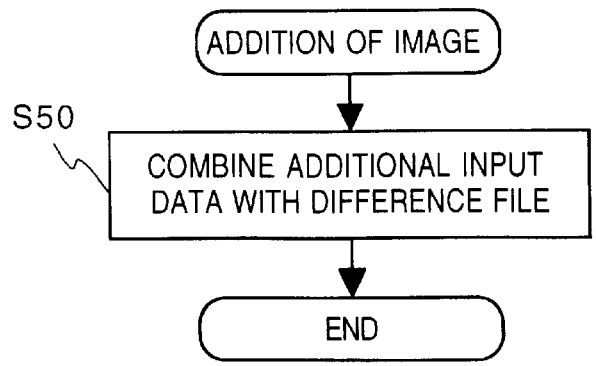
FIG. 13 is a flowchart showing image adding processing of the information processing apparatus of the third embodiment.

FIG. 12 shows a procedure for image outputting based on the image data transmitted/received in accordance with the above processings. FIG. 13 shows a procedure for writing of additional information on the displayed image.

In FIG. 12, in a case where received image data is outputted in the form of a display image, if a difference file exists in the memory 3, the difference file and a main file is combined and displayed (steps S46 and S47). If no difference file is stored in the memory 3, only the main file is displayed (step S48).

In FIG. 13, in a case where additional information is inputted with respect to a displayed image by drawing an image using the digitizer 25 on the displayed image, if a difference file exists in the memory 3, the data of the additional input is combined with the difference file and stored into the memory 3. If no difference file is stored, the additionally-input data is stored as a difference file (step S50).

In this manner, in a case where a plurality of additional inputs are made with respect to the same original image data, memory capacity can be saved, further, as difference data is obtained at each additional input, quick transmission can be attained.

Fourth Embodiment

In the second embodiment, original image data is transmitted via facsimile communication. Further, in a case where a large number of images based on the original image data such as test questions and vouchers are printed out, it is preferable that original image data is registered.

Figure 14:
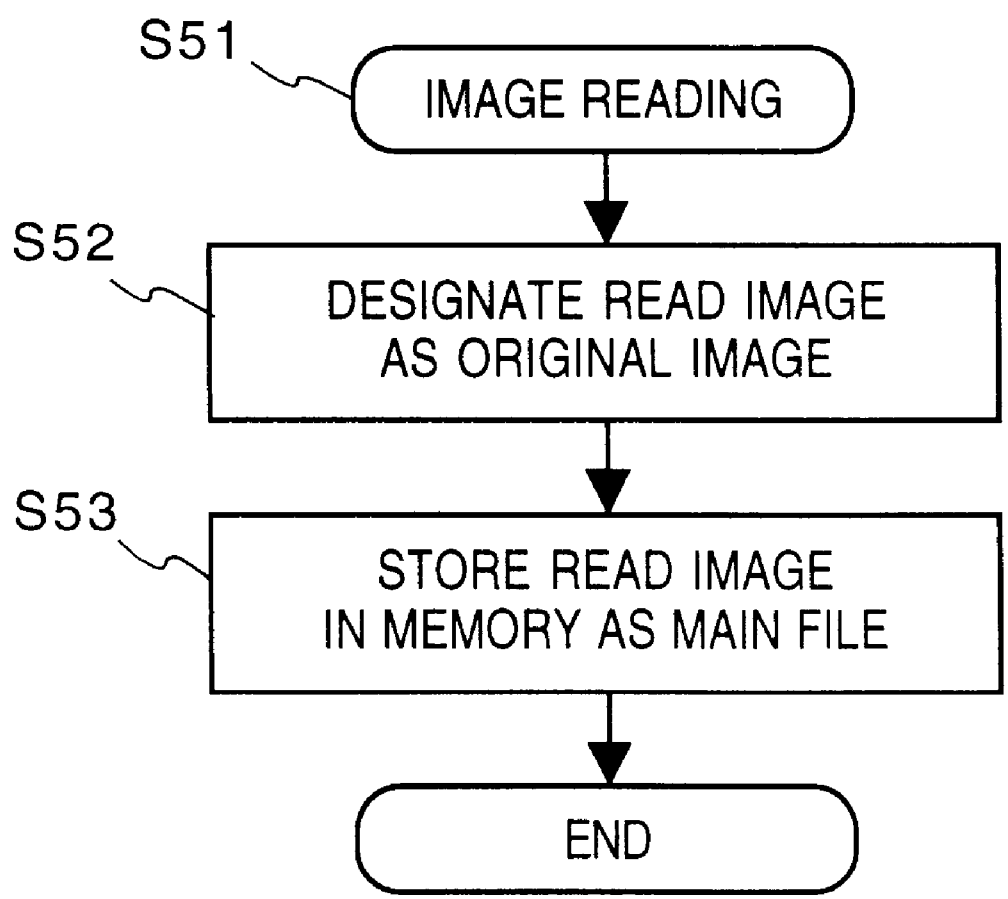
FIG. 14 is a flowchart showing original reading processing according to a fourth embodiment of the present invention.

FIG. 14 is a flowchart showing the registration processing. When an original image is read (step S51) and designated as original image data from the keypad (step S52), the image data is registered as the original image data in the memory such as the RAM 15 or the HDD 18 (step S53). This registered data may be treated as the head image data in the first embodiment or as the main file in the third embodiment. In this example, the registered original image data is generated by reading an image with, e.g., an image scanner.

In this manner, once image data is registered as original image data, repetitive communication can be made by only transmitting the registered data and receiving additional data.

Further, when an original image data is read from a storage medium such as a floppy disk or a CD-ROM, identification information may be added to the stored information in advance. However, if the stored data does not include identification information, or if another identification information is to be added, the stored information can be registered as described above.

Note that original image data may be generated on an information processing apparatus such as a personal computer.

The present invention can be applied to a system constituted by a plurality of devices, or to an apparatus comprising a single device. Furthermore, the invention is applicable also to a case where the object of the invention is attained by supplying a program to a system or apparatus.

As described above, an image transmission method and apparatus and a facsimile apparatus according to the present invention transmit only difference data with respect to the same information that is repeatedly transmitted, thus save communication time and costs. In addition, a plurality of difference data are stored as difference files, which can save memory capacity.

The present invention is not limited to the above embodiments and various changes and modifications can be made within the spirit and scope of the present invention. Therefore, to appraise the public of the scope of the present invention, the following claims are made.

What is claimed is:

1. An image information transmission apparatus for transmitting image information, comprising:

memory means for storing image information, corresponding to a plurality of images, outputted by said image information transmission apparatus, based on image information transmitted to said image information transmission apparatus from a remote communicating party;

input means for inputting image information;

calculation means for calculating difference image information between the image information inputted by said input means and the outputted image information stored in said memory means; and transmission means for transmitting the difference image information, calculated by said calculation means, back to the communicating party, wherein said transmission means adds identification information to the difference image information.

2. The apparatus according to claim 1, wherein said input means is an image scanner.

3. The apparatus according to claim 1, wherein said input means is a digitizer which inputs image data to be added to the original image data.

4. The apparatus according to claim 1, wherein said calculation means generates respective difference image information for each of a plurality of transmission destinations, and said transmission means transmits the respective difference image information to the plurality of transmission destinations respectively.

5. An image information transmission apparatus for transmitting image information, comprising:

memory means for storing image information, corresponding to a plurality of images, outputted by said image information transmission apparatus, based on image information transmitted to said image information transmission apparatus from a remote communicating party;

input means for inputting image information;

detection means for detecting identification information from the input image information, the identification information indicating that the image information inputted by said input means includes the image information stored in said memory means;

calculation means for calculating difference image information between the image information inputted by said input means and the image information stored in said memory means in accordance with the identification information; and transmission means for transmitting the difference image information, calculated by said calculation means, back to the communicating party.

6. The apparatus according to claim 5, wherein the identification information includes a character portion where character data is provided with respect to the original image information and a suffix to which a different value is provided at each transmission of difference image data, and wherein if identification information of the original image information stored in said memory means and the identification information of the image information inputted by said input means coincide, said calculation means calculates the difference image information between those image informations.

7. The apparatus according to claim 5, wherein said input means is an image scanner.

8. The apparatus according to claim 5, wherein said input means is a digitizer which inputs image data to be added to the original image data.

9. The apparatus according to claim 5, wherein said transmission means transmits the difference image information to the plurality of transmission destinations and said calculation means generates difference image information for each transmission destination.

10. An image information receiving apparatus for receiving image information, comprising:

memory means for storing image information, corresponding to a plurality of images, outputted by a remote communicating party;

reception means for receiving image information from the communicating party;

detection means for detecting whether or not identification information is included in the received image data, the identification information indicating that the image information received by said reception means is different from the image information stored in said memory means;

combination means for, if said detection means detects the identification information, combining the image information stored in said memory means with the image information received by said reception means; and output means for outputting the image information combined by said combination means.

11. The apparatus according to claim 10, further comprising addition means for, if said detection means detects the identification information, adding the identification information to the image information combined by said combination means.

12. The apparatus according to claim 10, wherein said memory means holds the original image information and identification information which indicates that the image information is the original image information of the difference image information, and wherein said combination means compares the identification information stored in said memory means with the identification information detected by said detection means, and if those identification informations coincide, combines the original image information stored in said memory means with the image information received by said reception means.

13. The apparatus according to claim 10, wherein said output means includes printing means for print-outputting an image.

14. The apparatus according to claim 10, wherein said output means includes display means for display-outputting an image.

15. The apparatus according to claim 10, further comprising difference storage means for storing difference image information from the original image information stored in said memory means for each destination of transmission of the difference image information, wherein if the image information received by said reception means is the difference image information, said combination means combines the difference image information with the difference image information stored in said difference storage means.

16. The apparatus according to claim 15, wherein said output means outputs the image data combined from the original image information stored in said memory means and the difference image information stored in said difference storage means.

17. An image information communication apparatus for transmitting/receiving image information, comprising:

memory means for storing first image information, corresponding to a first plurality of images, outputted by a remote communicating party and second image information, corresponding to a second plurality of images, outputted by said image information communication apparatus;

input means for inputting image information to be stored in said memory means as the first image information;

calculation means for calculating difference image information between the image information inputted by said input means and the second image information stored in said memory means;

transmission means for transmitting the difference image information calculated by said calculation means to the communicating party;

reception means for receiving image information from the communicating party;

detection means for detecting whether or not the image information received by said reception means includes identification information which indicates that the image information received by said reception means is different from the first image information stored in said memory means;

combination means for, if said detection means detects the identification information, combining the first image information stored in said memory means with the image information received by said reception means and storing the combined image information in said memory means as the second image information; and output means for outputting the image information combined by said combination means.

18. The apparatus according to claim 17, further comprising instruction means for instructing transmission of the difference image information, wherein said calculation means calculates the difference image information in accordance with instruction by said instruction means.

19. The apparatus according to claim 18, wherein said transmission means adds identification information to control information for transmitting the image information, in accordance with the instruction by said instruction means.

20. The apparatus according to claim 17, further comprising second detection means for detecting identification information, which indicates that image information inputted by said input means includes the second image information, from the input image information, wherein said calculation means calculates the difference image information in accordance with the identification information.

21. The apparatus according to claim 20, wherein the identification information includes a character portion where character data is provided with respect to the original image information and a suffix to which a different value is provided at each transmission of difference image data, and wherein if identification information of the original image information stored in said memory means and the identification information of the image information inputted by said input means coincide, said calculation means calculates the difference image information between those image informations.

22. The apparatus according to claim 17, wherein said input means is an image scanner.

23. The apparatus according to claim 17, wherein said input means is a digitizer which inputs image data to be added to the image data stored in said first memory means.

24. The apparatus according to claim 17, wherein said calculation means generates difference image information for each transmission destination.

25. The apparatus according to claim 20, further comprising addition means for, if said second detection means detects the identification information, adding the identification information to the image information combined by said combination means.

26. The apparatus according to claim 20, wherein said second memory means holds the original image information and identification information which indicates that the image information is the original image information of the difference image information, and wherein said combination means compares the identification information stored in said second memory means with the image information detected by said second detection means, and if those identification informations coincide, combines the original image information stored in said second memory means with the image information inputted by said input means.

27. The apparatus according to claim 17, wherein said output means includes printing means for print-outputting an image.

28. The apparatus according to claim 17, wherein said output means includes display means for display-outputting an image.

29. The apparatus according to claim 17, further comprising difference storage means for storing difference image information from the original image information stored in said second memory means for each destination of transmission of the difference image information, wherein if the image information received by said reception means is the difference image information, said combination means combines the difference image information with the difference image information stored in said difference storage means.

30. The apparatus according to claim 29, wherein said output means outputs the image data combined from the original image information stored in said second memory means and the difference image information stored in said difference storage means.

31. A facsimile apparatus for transmitting/receiving image information, comprising:

a memory for storing first image information, corresponding to a first plurality of images, printed out by a remote communicating party and second image information, corresponding to a second plurality of images, printed out by said facsimile apparatus;

input means for inputting image information by an image scanner to be stored in said memory as the first image information;

first detection means for detecting whether or not the image data inputted by the image scanner includes first identification information, the first identification information indicating that the image data inputted by said image scanner includes the second image information;

calculation means for, if said first detection means detects the first identification information, calculating difference image information between the image information inputted by said image scanner and the second image information stored in said memory means;

transmission means for transmitting the difference image information, calculated by said calculation means, with identification information identifying the difference image information to the communicating party;

reception means for receiving image information from the communicating party;

second detection means for detecting whether or not the image information received by said reception means includes second identification information indicating that the image information received by said reception means is different from the first image information;

combination means for, if said second detection means detects the second identification information, combining the first image information stored in said memory means with the image information received by said reception means, and adding the first identification information to the combined image data; and a printer for printing out an image based on the image information combined by said combination means, wherein said memory means holds the image information combined by said combination means as the second image information.

32. A facsimile apparatus for transmitting/receiving image information, comprising:

a memory for storing first image information, corresponding to a first plurality of images, printed out by a remote communicating party and second image information, corresponding to a second plurality of images, printed out by said facsimile apparatus;

input means for inputting image information by a digitizer and storing the inputted image information in said memory means as the first image information;

calculation means for calculating difference image information between the first image information and the second image information stored in said memory means;

transmission means for transmitting the difference image information, calculated by said calculation means, with first identification information identifying the difference image information to the communicating party;

reception m means for receiving image information from the communicating party;

detection means for detecting whether or not the image information received by said reception means includes second identification information, the second identification information indicating that the image information received by said reception means is different from the first image information;

combination means for, if said detection means detects the second identification information, combining the first image information stored in said memory means with the image information received by said reception means; and a display for displaying an image based on the image information combined by said combination means, wherein said memory means holds the image information combined by said combination means as the second image information.

33. An image information transmission method operative in an image information transmission apparatus for transmitting image information, comprising:

a storage step of storing, in a memory, image information corresponding to a plurality of images outputted by the image information transmission apparatus, based on image information transmitted to the information transmission apparatus from a remote communicating party;

an input step of inputting image information;

a calculation step of calculating difference image information between the image information inputted in said input step and the image information stored in the memory; and a transmission step of transmitting the difference image information, calculated in said calculation step, back to the communicating party, wherein in said transmission step, identification information is added to the difference image information.

34. The method according to claim 33, wherein in said calculation step, respective difference image information is generated for each of a plurality of transmission destinations and, in said transmission step, the respective difference image information is transmitted to the plurality of transmission destinations respectively.

35. An image information transmission method operative in an image information transmission apparatus for transmitting image information, comprising:

a storage step of storing, in a memory, image information corresponding to a plurality of images outputted by the image information transmission apparatus, based on image information transmitted to the image information transmission apparatus from a remote communicating party;

an input step of inputting image information;

a detection step of detecting identification information from the input image information, the identification information indicating that the image information inputted in said input step includes the image information stored in the memory;

a calculation step of calculating difference image information between the image information inputted in said input step and the image information stored in the memory in accordance with the identification information; and a transmission step of transmitting the difference image information, calculated in said calculation step, to the communicating party.

36. The method according to claim 35, wherein the identification information includes a character portion where character data is provided with respect to the original image information and suffix to which a different value is provided at each transmission of difference image data, and wherein if identification information of the original image information stored in said storage step and the identification information of the image information inputted in said input step coincide, the difference image information between those image informations is calculated in said calculation step.

37. An image information receiving method for receiving image information, comprising:

a storage step of storing image information corresponding to a plurality of images outputted by a remote communicating party;

a reception step of receiving image information transmitted by the communicating party;

a detection step of detecting whether or not identification information is included in the received image data, the identification information indicating that the image information received in said reception step is different from the image information stored in said storage storage step;

a combination step of, if the identification information is detected in said detection step, combining the image information stored in said storage step with the image information received in said reception step; and an output step of outputting the image information combined in said combination step.

38. The method according to claim 37, further comprising an addition step of, if the identification information is detected in said detection step, adding the identification information to the image information combined in said combination step.

39. The method according to claim 37, wherein in said storage step, the original image information and identification information which indicates that the image information is the original image information of the difference image information are stored, and wherein in said combination step, the identification information stored in said storage step is compared with the identification information detected in said detection step, and if those identification informations coincide, the original image information stored in said storage step is combined with the image information received in said reception step.

40. The method according to claim 37, further comprising a difference storage step for storing difference image information from the original image information, stored in said storage step, for each destination of transmission of the difference image information, wherein if the image information received in said reception step is the difference image information, in said combination step, the difference image information is combined with the difference image information stored in said difference storage step.

41. The method according to claim 40, wherein in said output step, the image data combined from the original image information stored in said storage step and from the difference image information stored in said difference storage step is outputted.

42. An image information communication method operative in a communication apparatus for transmitting/receiving image information, comprising:

an input step of inputting image information corresponding to a first plurality of images;

a first storage step of storing the image information inputted in said input step in a memory as first image information outputted by a remote communicating party;

a calculation step of calculating difference image information between the image information inputted in said input step and second image information corresponding to a second plurality of images stored in the memory;

a transmission step of transmitting the difference image information calculated in said calculation step to the communicating party;

a reception step of receiving image information transmitted by the communicating party;

a detection step of detecting whether or not the image information received in said reception step includes identification information which indicates that the image information received in said reception step is different from the first image information;

a combination step of, if the identification information is detected in said detection step, combining the first image information stored in said first storage step with the image information received in said reception step;

a second storage step of storing the image information combined in said combination step in the memory as the second image information; and an output step of outputting the image information combined in said combination step, wherein in said calculation step, the second image information is the image information previously stored in said second storage step.

43. The method according to claim 42, further comprising an instruction step of instructing transmission of the difference image information, wherein in said calculation step, the difference image information is calculated in accordance with instruction made in said instruction step.

44. The method according to claim 43, wherein in said transmission step, identification information is added to control information for transmitting the image information, in accordance with the instruction made in said instruction step.

45. The method according to claim 42, further comprising a detection step of detecting identification information, which indicates that image information inputted in said input step is difference image information from the original image information, from the input image information, wherein in said calculation step, the difference image information is calculated in accordance with the identification information.

46. The method according to claim 45, wherein the identification information includes a character portion where character data is provided with respect to the original image information and suffix to which a different value is provided at each transmission of difference image data, and wherein if identification information of the original image information stored in said storage step and the identification information of the image information inputted in said input step coincide, the difference image information between those image informations is calculated in said calculation step.

47. The method according to claim 42, wherein in said calculation step, difference image information is generated for each transmission destination.

48. The method according to claim 45, further comprising an addition step of, if the identification information is detected in said second detection step, adding the identification information to the image information combined in said combination step.

49. The method according to claim 45, wherein in said second storage step, the original image information and identification information which indicates that the image information is the original image information of the difference image information are stored, and wherein in said combination step, the identification information stored in said second storage step is compared with the image information detected in said second detection step, and if those identification informations coincide, the original image information stored in said second storage step is combined with the image information inputted in said input step.

50. The method according to claim 42, further comprising a difference storage step of storing difference image information from the original image information, stored in said second storage step, for each destination of transmission of the difference image information, wherein if the image information received in said reception step is the difference image information, in said combination step, the difference image information is combined with the difference image information stored in said difference storage step.

51. The method according to claim 50, wherein in said output step, the image data combined from the original image information stored in said second storage step and from the difference image information stored in said difference storage step is outputted.

52. A computer-readable memory holding program codes which, when inserted into a programmable apparatus, causes the apparatus to execute an image information transmission method, said method comprising the steps of:

storing image information, corresponding to a plurality of images, in a memory, based on image information transmitted to the programmable apparatus from a remote communication party;

inputting image information;

detecting identification information from the input image information, the identification information indicating that the image information inputted in said inputting step includes the image information stored in the memory;

calculating difference image information between the image information inputted in said inputting step and the image information stored in the memory in said storing step in accordance with the identification information; and transmitting the difference image information, calculated in said calculating step, to the communicating party.

53. A computer-readable memory holding program codes which, when inserted into a programmable apparatus, causes the apparatus to execute an image information reception method, said method comprising the steps of:

storing image information corresponding to a plurality of images outputted by a remote communicating party;

receiving image information transmitted by the communicating party;

detecting whether or not identification information is included in the received image data, the identification information indicating that the image information received in said receiving step is different from the image information stored in said storing;

combining, if the identification information is detected in said detecting step, the image information stored in said storing step with the image information received in said receiving; and outputting the image information combined in said combining step.

54. A computer-readable memory holding program codes which, when inserted into a programmable apparatus, causes the apparatus to execute an image information communication method, said method comprising the steps of:

inputting image information corresponding to a first plurality of images;

storing the image information inputted in said inputting step as first image information outputted by a remote communicating party;

calculating difference image information between the image information inputted in said inputting step and second image information corresponding to a second plurality of images;

transmitting the difference image information calculated in said calculating step to the communicating party;

receiving image information transmitted by the communicating party;

detecting whether or not identification information is included in the image information received in said receiving step, the identification information indicating that the image information received in said receiving step is different from the first image information;

combining, if the identification information is detected in said detecting step, the first image information stored in said first storing step with the image information received in said receiving step;

storing the image information combined in said combining step as the second image information; and outputting the image information combined in said combining step, wherein in said calculating step, the second image information is the image information previously stored in said second storing step.

* * * * *

UNITED STATES PATENT AND TRADEMARK OFFICE
CERTIFICATE OF CORRECTION

PATENT NO. : 6,031,634
DATED : February 29, 2000
INVENTOR(S) : KAZUTOSHI SHIMADA ET AL.                    Page 1 of 3

It is certified that error appears in the above-identified patent and that said Letters Patent is hereby corrected as shown below:

ON THE TITLE PAGE:

[54] TITLE

"IMAGE INFORMATION TRANSMITTING METHOD AND APPARATUS" should read
--IMAGE INFORMATION TRANSMISSION METHOD AND APPARATUS FOR TRANSMITTING DIFFERENCE IMAGE INFORMATION AND IDENTIFICATION INFORMATION--.

[56] REFERENCE CITED

Foreign Patent Documents
"03014361" should read --3-014361--.

COLUMN 1

Lines 1-2, "TRANSMITTING METHOD AND APPARATUS" should read --TRANSMISSION METHOD AND APPARATUS FOR TRANSMITTING DIFFERENCE IMAGE INFORMATION AND IDENTIFICATION INFORMATION--.
Line 46, "inlet" should read --intent--.

UNITED STATES PATENT AND TRADEMARK OFFICE
CERTIFICATE OF CORRECTION

PATENT NO. : 6,031,634

DATED : February 29, 2000

INVENTOR(S) : KAZUTOSHI SHIMADA ET AL.                Page 2 of 3

It is certified that error appears in the above-identified patent and that said Letters Patent is hereby corrected as shown below:

COLUMN 2

Line 38, "and," should read --and--.

COLUMN 4

Line 35, "adds" should read --receiver A adds--.
   Line 54, "code," should read --code--.

COLUMN 8

Line 20, "flowchart" should read --flowcharts--.
   Line 66, "a" should read --of when a--.

COLUMN 9

Line 62, "is" should read --are--.

COLUMN 10

Line 49, "save" should read --saving--.

UNITED STATES PATENT AND TRADEMARK OFFICE
CERTIFICATE OF CORRECTION

PATENT NO.    :   6,031,634

DATED         :   February 29, 2000

INVENTOR(S)   :   KAZUTOSHI SHIMADA ET AL.

It is certified that error appears in the above-identified patent and that said Letters Patent is hereby corrected as shown below:

COLUMN 15

Line 19, "m" should be deleted.

Signed and Sealed this

Sixth Day of March, 2001

Attest:

NICHOLAS P. GODICI

Attesting Officer

Acting Director of the United States Patent and Trademark Office